United States Patent
Bloom

(10) Patent No.: US 7,441,467 B2
(45) Date of Patent: Oct. 28, 2008

(54) COMPRESSION STRAIN SENSOR

(75) Inventor: Terry R. Bloom, Middlebury, IN (US)

(73) Assignee: CTS Corporation, Elkhart, IN (US)

( * ) Notice: Subject to any disclaimer, the term of this patent is extended or adjusted under 35 U.S.C. 154(b) by 120 days.

(21) Appl. No.: 11/484,929

(22) Filed: Jul. 12, 2006

(65) Prior Publication Data

US 2008/0011095 A1   Jan. 17, 2008

(51) Int. Cl.
G01N 3/08 (2006.01)
(52) U.S. Cl. ............... 73/819; 73/862.041; 73/862.044; 73/862.045; 73/862.381; 73/862.474; 73/862.627
(58) Field of Classification Search .......... 73/777, 73/819, 862.041–862.045, 862.381, 862.391, 73/862.451, 862.474, 862.627
See application file for complete search history.

(56) References Cited

U.S. PATENT DOCUMENTS

| | | | |
|---|---|---|---|
| 4,188,636 A | | 2/1980 | Sato et al. |
| RE31,698 E | | 10/1984 | Sansome et al. |
| 5,341,688 A | * | 8/1994 | Morikawa et al. ......... 73/862.68 |
| 5,773,728 A | * | 6/1998 | Tsukada et al. .......... 73/862.68 |
| 5,867,886 A | | 2/1999 | Ratell et al. |
| 5,898,359 A | | 4/1999 | Ellis et al. |
| 5,907,095 A | | 5/1999 | Lin |
| 5,959,214 A | | 9/1999 | Vaidyanthan et al. |
| 5,966,117 A | | 10/1999 | Seffernick et al. |
| 5,985,183 A | | 11/1999 | Hori et al. |
| 6,056,888 A | | 5/2000 | August |
| 6,161,891 A | | 12/2000 | Blakesley |
| 6,225,526 B1 | | 5/2001 | Flugge et al. |
| 6,231,076 B1 | | 5/2001 | Blakesley et al. |
| 6,244,116 B1 | | 6/2001 | Osmer et al. |
| 6,407,347 B1 | | 6/2002 | Blakesley |
| 6,407,350 B1 | | 6/2002 | Blakesley |
| 6,803,658 B2 | | 10/2004 | Suzuki |
| 6,915,702 B2 | * | 7/2005 | Omura et al. .................. 73/777 |
| 7,010,986 B2 | * | 3/2006 | Nakao et al. .................. 73/776 |

(Continued)

FOREIGN PATENT DOCUMENTS

DE        31 25 640        1/1983

(Continued)

OTHER PUBLICATIONS

Koch, Florian, PCT International Search Report mailed Nov. 2, 2008 re: International Application No. PCT/US2007/012371 filed May 23, 2007.

(Continued)

Primary Examiner—Edward Lefkowitz
Assistant Examiner—Freddie Kirkland, III
(74) Attorney, Agent, or Firm—Mark P. Bourgeois

(57) ABSTRACT

A sensor is disclosed for sensing an applied load. The sensor includes a rigid substrate. A strain sensitive resistor is mounted to the substrate. The resistor has a pair of ends. The resistor has a length and a width that defines an area. A pair of conductors are connected to the end of the resistor. A dielectric layer is mounted over the resistor. A load transfer device is mounted to the dielectric layer. The load transfer device transfers the applied load directly to the strain sensitive resistor such that the resistor is compressed. The resistor changes resistance in response to the applied load.

17 Claims, 6 Drawing Sheets

U.S. PATENT DOCUMENTS

| | | | |
|---|---|---|---|
| 7,082,844 B1 * | 8/2006 | Cook et al. | 73/862.041 |
| 7,278,326 B2 * | 10/2007 | Kobayashi et al. | 73/862.041 |
| 7,290,323 B2 * | 11/2007 | Deconde et al. | 29/595 |
| 2002/0166385 A1 * | 11/2002 | Bloom et al. | 73/777 |
| 2003/0213623 A1 | 11/2003 | Axakov et al. | |
| 2005/0206011 A1 | 9/2005 | Maehara et al. | |
| 2006/0179957 A1 * | 8/2006 | Cook et al. | 73/862.041 |

FOREIGN PATENT DOCUMENTS

DE  41 11 148  10/1992

OTHER PUBLICATIONS

Koch, Florian, PCT Written Opinion of the International Searching Authority mailed Nov. 2, 2008 re: International Application No. PCT/US2007/012371 filed May 23, 2007.

* cited by examiner

COMPRESSION STRAIN SENSOR

BACKGROUND

The present invention relates to load cells or stain gage sensors in general and in particular to a compression stain sensor in which the sensor is directly compressed by an applied load.

It is known to use load cells and strain gages to sense loads. Conventional load cells typically include a beam and one or more strain gages mounted to the beam. Deflection or bending of the beam due to an applied load changes the shape of the strain gages, resulting in a change in the resistance of the strain gages.

The strain gauges typically consist of thin film or metal foil resistors that are mounted on polyimide films. The film is then mounted to the beam by a gluing process. Generally, a known input voltage is applied to the strain gages and an output signal from the strain gages varies as the resistance of the strain gages vary to provide a signal indicative of the load applied to the load cell.

Other types have load cells use strain gages have used thick film resistors that are mounted to a steel substrate over a dielectric material. As the steel substrate bends or flexes under the applied load, the resistors are placed into tension or compression and the resistance of the resistor's changes.

The load cells of the prior art suffer from a major disadvantage in that their output is influenced by and must be calibrated to the bending substrate. In some applications, the mechanical structure of the device cannot be designed to accommodate a bending beam. Further, the use of glued on strain gages causes variations in the data that is collected due to variations in the strength and thickness of the glue. Therefore, an improved load cell with better accuracy is desired.

SUMMARY OF THE INVENTION

It is a feature of the present invention to provide a sensor for measuring the force, weight or load applied to an object.

It is a feature of the present invention to provide a sensor for sensing an applied load. The sensor includes a rigid substrate that has a first surface and a second surface. A first strain sensitive resistor is mounted to the first surface. The first resistor has a first end and a second end. The first resistor has a first length and a first width that defines a first area. A first conductor is mounted to the first surface and is connected to the first end. A second conductor is mounted to the second surface and is connected to the second end. A dielectric layer is mounted over the resistor. A load transfer device is mounted to the dielectric layer. The load transfer device transfers the applied load directly to the first strain sensitive resistor such that the first resistor is compressed. The first resistor changes resistance in response to the applied load.

BRIEF DESCRIPTION OF THE DRAWINGS

It is noted that the drawings of the invention are not to scale. In the drawings, like numbering represents like elements among the drawings.

DETAILED DESCRIPTION

Figure 1:
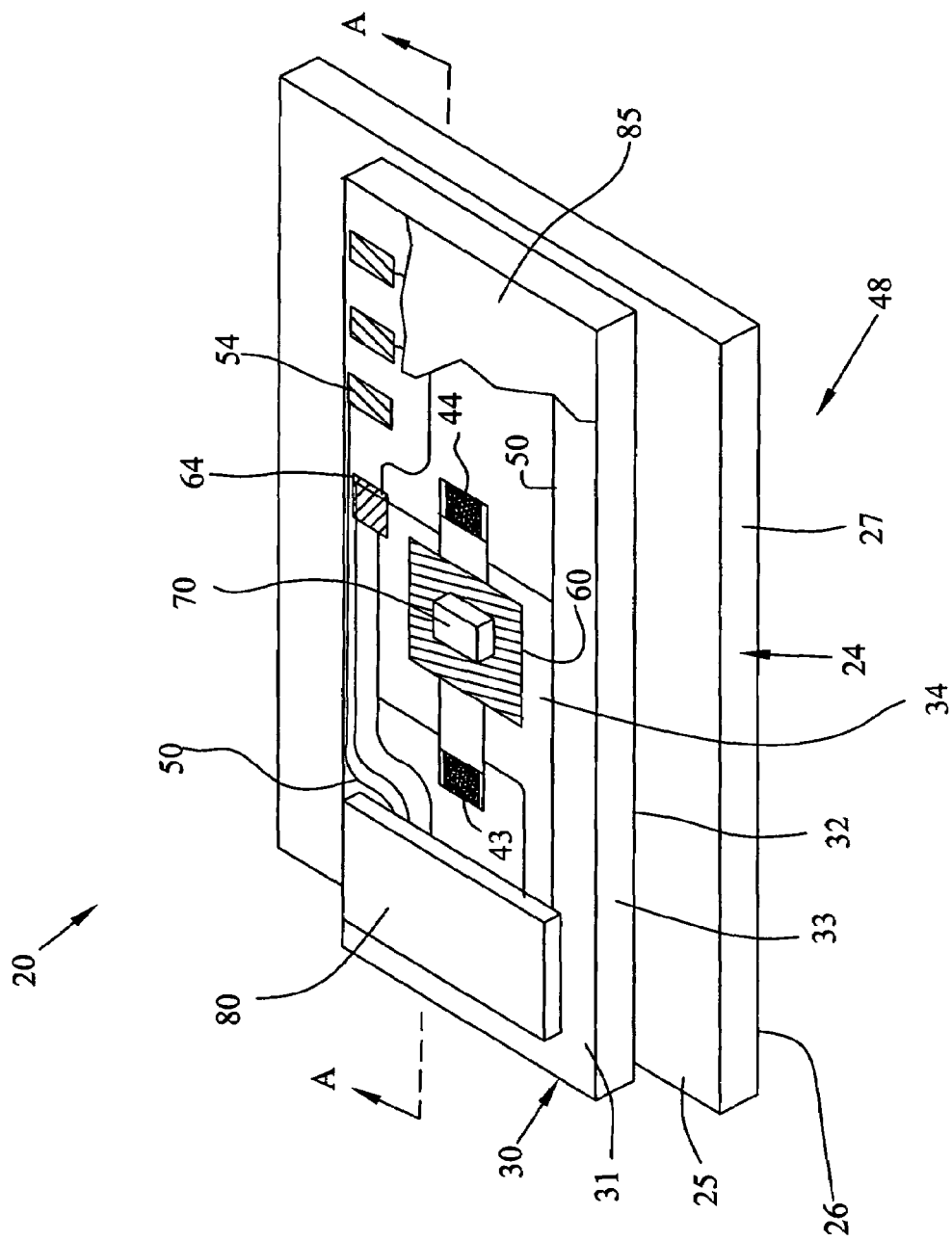
FIG. 1 is a perspective view of a compression strain sensor in accordance with the present invention.
Figure 2:
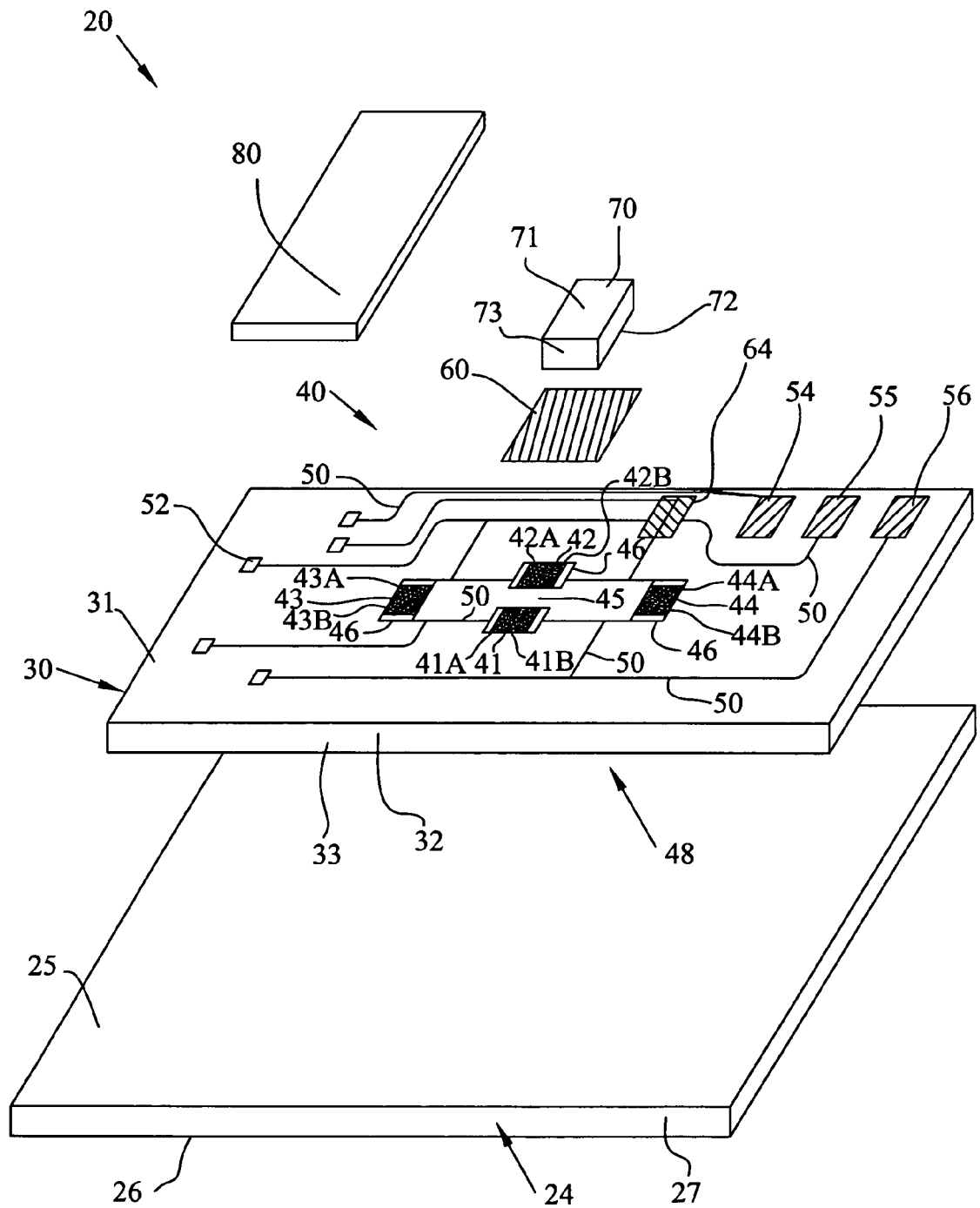
FIG. 2 is an exploded view of FIG. 1.
Figure 3:
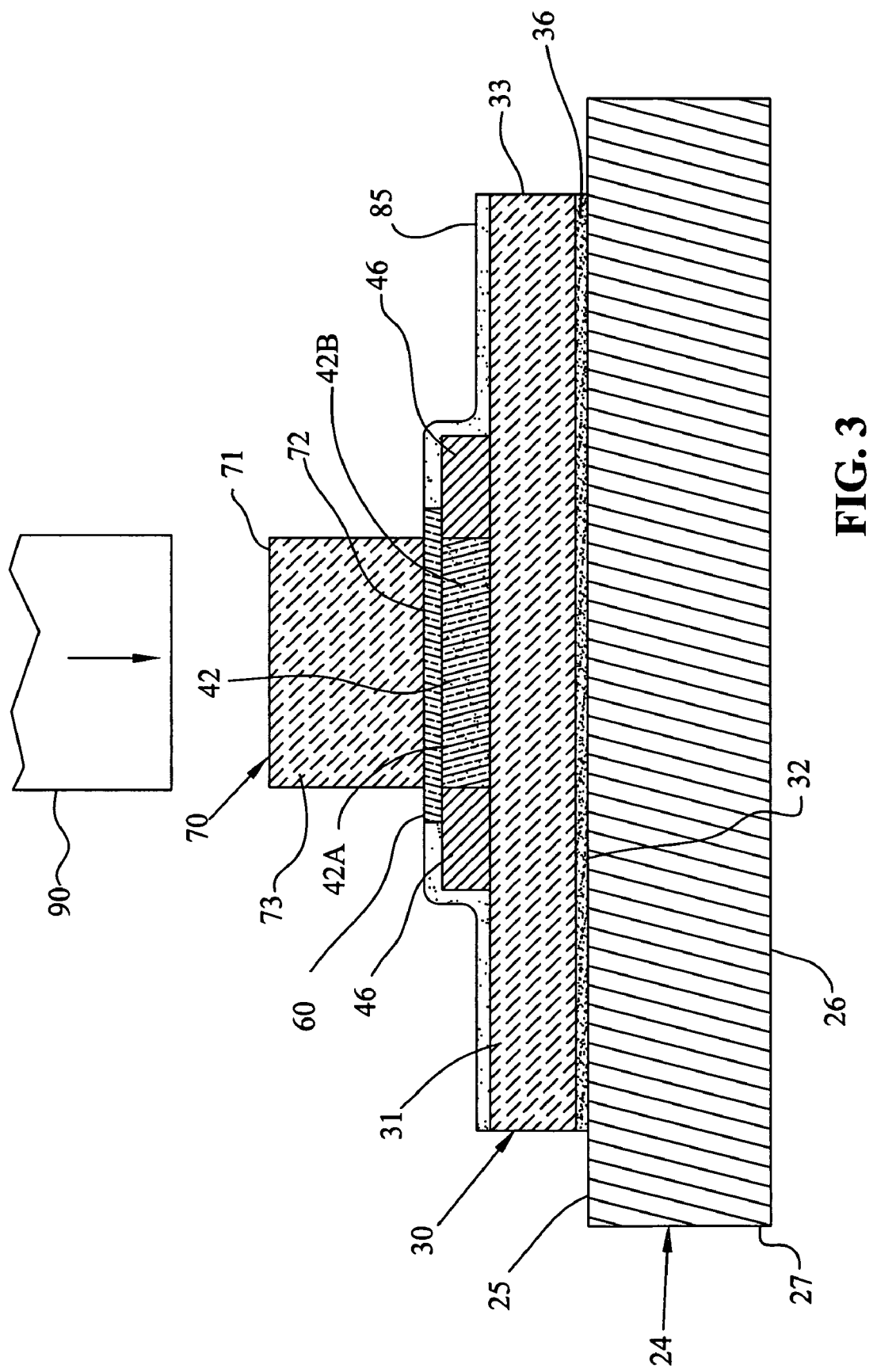
FIG. 3 is a side cross-sectional view of FIG. 1 taken along section line A-A.
Figure 4:
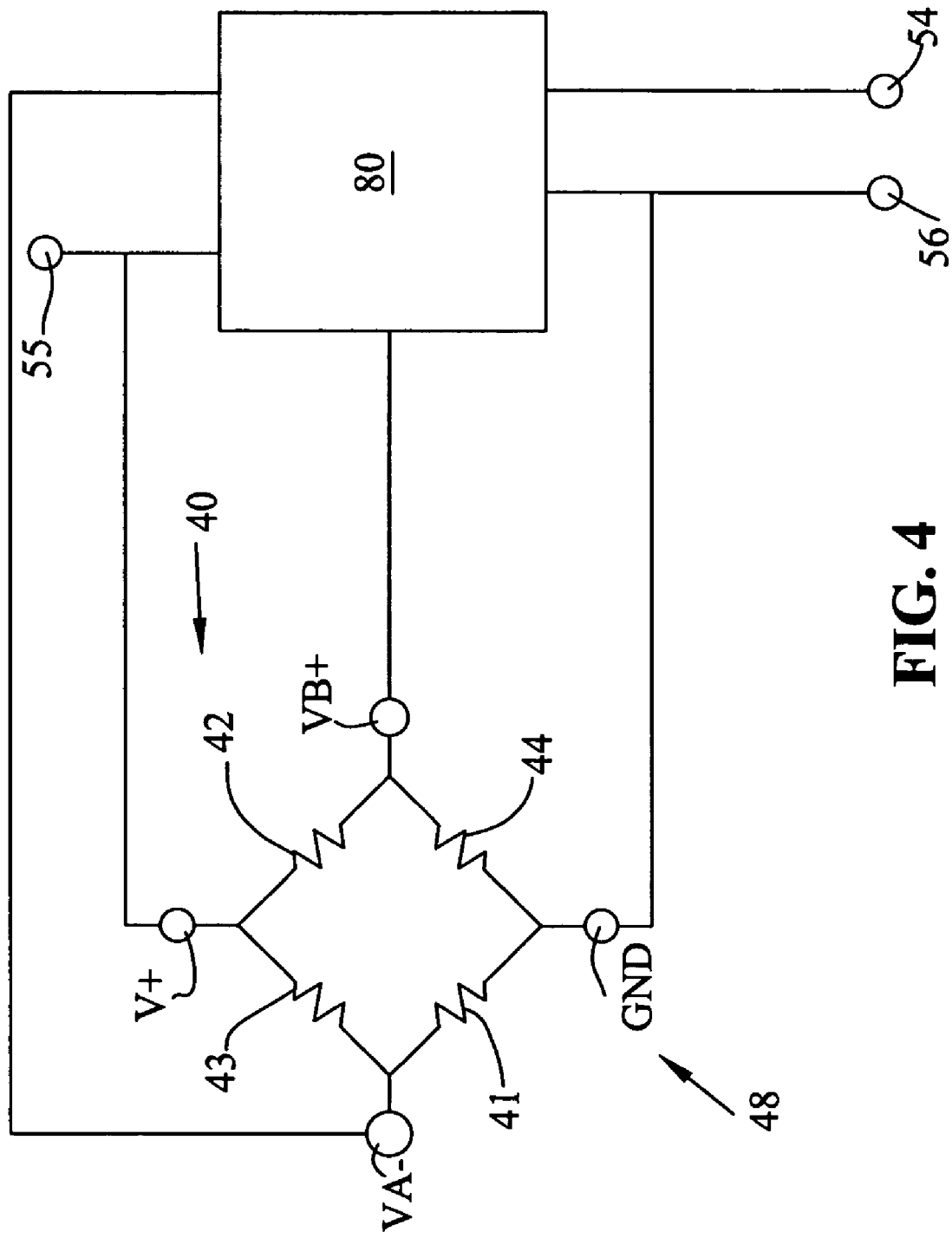
FIG. 4 is a schematic diagram of the circuit of FIG. 1.

Referring to FIGS. 1-4, a load cell or compressive strain gage sensor 20 is shown. Sensor 20 includes a rigid rectangular shaped support member 24 having a top surface 25, a bottom surface 26. Support member 24 can be fabricated from several materials such as metals or ceramics. One possible ceramic is 96% Alumina that is 40 mils in thickness. A ceramic substrate 30 is mounted or placed adjacent to top surface 25. Insulating ceramic substrate 30 can include a top surface 31, bottom surface 32, side surfaces 33 and a central area 34. Ceramic substrate 30 can be formed from a wide variety of ceramic materials such as aluminum oxide, aluminum nitride and silicon carbide. Substrate 30 can also be formed of low temperature co-fired ceramic, glass or a metal with an applied dielectric surface. Substrate 30 can be mounted to support member 24 by an adhesive 36.

Several strain or pressure sensitive resistors 40 can be located on top surface 31 in central area 34. Resistors 40 include individual resistors 41, 42, 43 and 44. Each resistor has a pair of ends. Resistor 41 has ends 41A and 41B. Resistor 42 has ends 42A and 42B. Resistor 43 has ends 43A and 43B. Resistor 44 has ends 44A and 44B. A space 45 is located between resistors 41 and 42. Conductors 46 are mounted on top surface 31 and are attached to each end of each of the resistors.

The resistors 40 can be applied film resistors. Preferably resistors 40 are thick film resistors with ruthenium oxide that are screen printed onto ceramic substrate 30 and fired in an oven. A preferred resistor composition is Heraeus 8241 resistor material, which is commercially available from Heraeus Corporation of West Conshohocken, Pa. Other types of resistors can also be used such as thin film, discrete or diffused silicon resistors.

The resistors may have their resistance value adjusted by using a laser to remove some of the resistor material. Alternatively, resistors 43 and 44 may be formed from a resistor material that does not change resistance with an applied strain.

Circuit lines 50 are mounted on top surface 31. Some of the circuit lines 50 are attached with conductors 46 such that the resistors 40 are connected into a wheatstone bridge 48. Several circuit lines 50 are connected with mounting pads 52 that are located on top surface 31. Mounting pads 52 are used to connect to signal processing electronics that are mounted on substrate 30. Circuit lines 50 are also connected with terminals 54, 55 and 56 that are located on top surface 31. Terminal 54 is connected to a source of power. Terminal 55 is connected to ground. Terminal 56 is a data signal terminal. Typically wires or electrodes (not shown) from a wire harness would be soldered or welded to terminals 54, 55 and 56 in order to make a connection with an external electrical circuit.

Conductors 46, circuit lines 50, mounting pads 52 and terminals 54, 55 and 56 can be thick film metals that are screen printed onto ceramic substrate 30 and fired in an oven. A preferred conductor composition is Heraeus 8717 material, which is commercially available from Heraeus Corporation of West Conshohocken, Pa. Other types of conductors can also be used such as thin films, etched copper layers or plated layers.

An insulating dielectric layer 60 is mounted over resistors 64 and 66 and a portion of top surface 31 in central area 34. Dielectric layer 60 can be a screened and fired glass layer. A preferred dielectric layer is Heraeus SD1000 material, which is commercially available from Heraeus Corporation of West Conshohocken, Pa. Layer 60 protects the resistors from corrosive environments while at the same time allowing the resistors to be compressed.

Another insulating dielectric layer 64 is mounted over one of the circuit lines 50 and on a portion of top surface 31 in order to provide and insulated path for another circuit line 50 to be routed.

A overcoat 85 (FIG. 1) can be applied over top surface 31, resistors 43, 44 and circuit lines 50 in order to prevent corrosion and damage. Overcoat 85 can be formed from an organic insulating overcoat material.

A ceramic actuator or load transfer device 70 is mounted to dielectric layer 60. Actuator 70 has a top 71, bottom 72 and sides 73. Ceramic actuator 70 can be placed onto dielectric layer 60 after the dielectric layer has been screened, but before firing. During firing, the ceramic actuator and dielectric layer sinter together and are attached to each other.

Ceramic actuator 70 is adapted to be contacted by an external force or load 90. Load 90 can be applied in wide variety of manners and sizes. Load 90 acts upon actuator 70 and directly compresses resistors 41 and 42 under dielectric layer 60 between the actuator 70, substrate 30 and support 24. The contact area or shape of actuator 70 is approximately the same size as the area covered by resistors 41 and 42. Actuator 70 conducts applied load 90 onto resistors 41 and 42 causing direct compression of resistors 41 and 42. Resistors 43 and 44 are not compressed and are out of the path of the applied load.

A signal conditioning circuit or integrated circuit 80 is attached to mounting pads 52 typically by soldering. Integrated circuit 80 is electrically connected to wheatstone bridge 48 through circuit lines 50. Integrated circuit 80 can amplify and filter an electrical signal that is produced by wheatstone bridge 48. Integrated circuit 80 may include temperature compensation circuitry. Integrated circuit 80 may further include an analog to digital converter (A/D) that allows the analog signal produced by the wheatstone bridge 48 to be output as a digital signal.

In the wheatstone bridge 48, resistors 41 and 42 are called the sense resistors and resistors 43 and 44 are called the reference resistors. Resistors 41 and 42 change resistance in response to direct compression by actuator 70. Resistors 43 and 44 have a relatively constant value as they are not exposed to direct compression. Since the resistors 41-44 are thermally coupled by substrate 30, they operate at about the same temperature. This minimizes the amount of temperature compensation that is needed and allows for more accurate measurements.

It is noted that resistors 41 and 42 are never placed in tension. In contrast, in load cells of the prior art that use bending beams, the resistors are placed in tension.

During operation, power is supplied to terminal 56 and ground to terminal 55. A voltage is generated across the wheatstone bridge, is amplified by integrated circuit 80 and provided as a data signal at terminal 54. As the load 90 is applied the voltage across the wheatstone bridge changes and accordingly so does the data signal at terminal 54.

Figure 5:
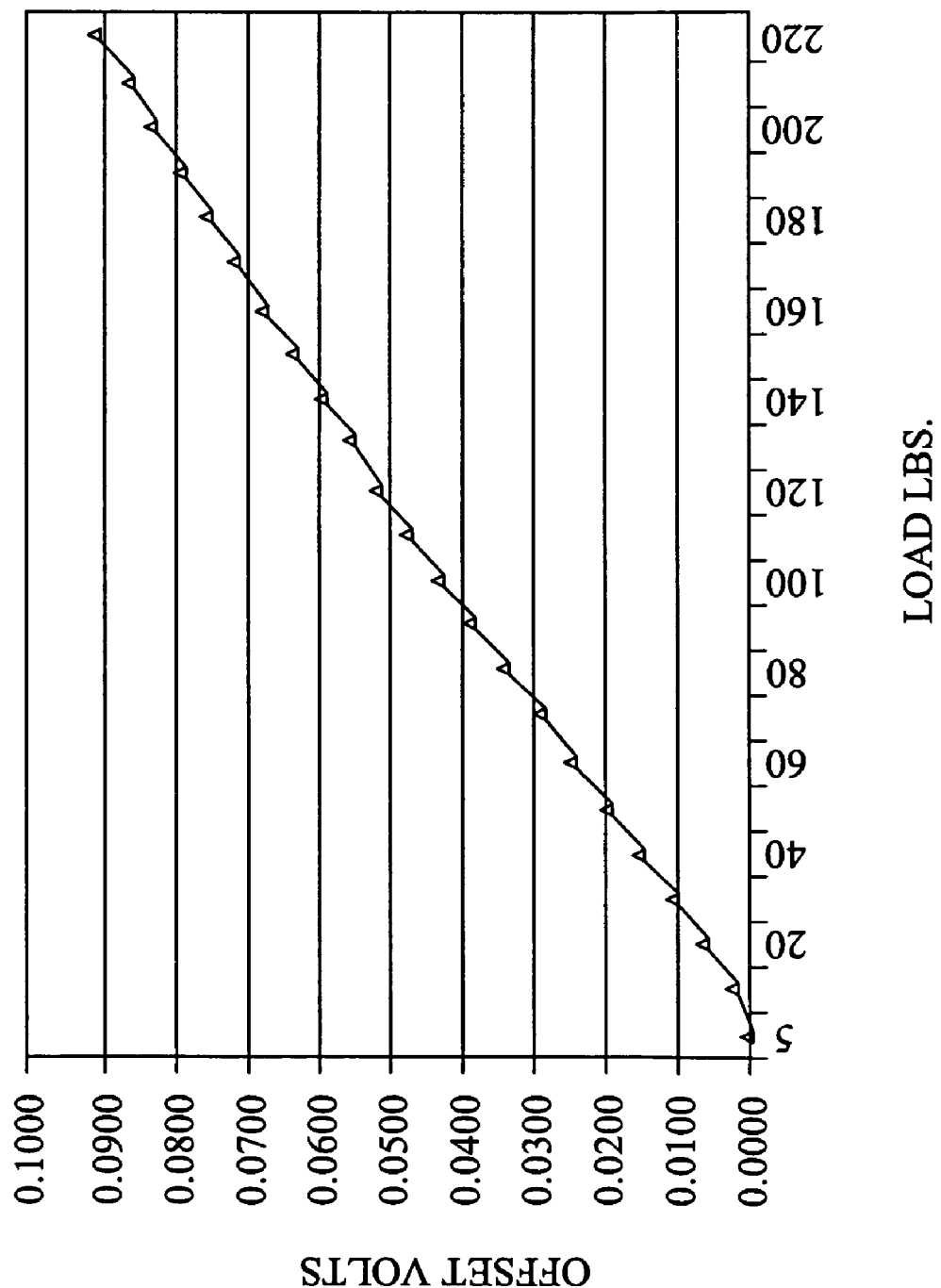
FIG. 5 is a graph of resistance versus applied load for the sensor of FIG. 1.

FIG. 5 shows a graph of voltage change versus applied load for load cell 20. The resistors change resistance linearly in response to the applied load. The output voltage of the wheatstone bridge also changes linearly with the applied load. The voltage change of the wheatstone bridge is about 0.01 volts with 35 pounds of applied load. The voltage change of the wheatstone bridge is about 0.09 volts with 220 pounds of applied load.

The applied load was cycled between 0 and 220 pounds in order to test the hysteresis and repeatability of the load cell. The sensor exhibited less than 0.1 percent error as it was cycled.

Resistors 41-44 can have identical dimensions or they can be different sizes. Resistors 41-44 have dimensions of x length, y width and z thickness that define a resistor volume and area. Resistor 41-44 were fabricated and tested having dimensions of 2.97 millimeters in length, 1.35 millimeters in width and 10 microns in thickness.

It is noted that substrates 24 and 30 are rigid and thick enough that they do not bend under the applied load. In other words, the substrates do not act like a bending beam.

Strain gage or load cell 20 has been used to experimentally measure applied loads that range from 0 to 2500 pounds for resistors with dimensions of 2.97 millimeters in length, 1.35 millimeters in width and 10 microns in thickness.

The size of the actuator bottom surface 72 determines the maximum load that can be sensed without damage to sensor 20. For the sensor design of the present invention, loads up to 20,000 pounds per square inch of applied actuator area can be measured.

Manufacturing

Strain gage sensor or load cell 20 can be manufactured using the following sequence of process steps:

1. The conductor material is screen printed onto top surface 31 of ceramic substrate 30 to form conductors 46, circuit lines 50, pads 52 and terminals 54, 55, 56.
2. The conductor material and substrate is fired in a tunnel kiln (850 degrees Centigrade peak for 10 minutes).
3. The dielectric material is screen printed onto surface 31 of substrate 30 over one of circuit lines 50 to form dielectric layer 64.
4. Dielectric layer 64 and the substrate are fired in a tunnel kiln (850 degrees Centigrade peak for 10 minutes).
5. The conductor material is screen printed onto surface 31 of substrate 30 to form circuit line 50 that extends over dielectric layer 64.
6. The conductor material and substrate is fired in a tunnel kiln (850 degrees Centigrade peak for 10 minutes).
7. The resistor material is screen printed onto surface 31 of substrate 30 to form resistors 41-44 with the resistor material touching conductors 46.
8. The resistor material and substrate is fired in a tunnel kiln (850 degrees Centigrade peak for 10 minutes).
9. The dielectric material is screen printed onto surface 31 of substrate 30 over resistors 41 and 42 to form dielectric layer 60.
10. Actuator 70 is placed on dielectric layer 60 over resistors 41 and 42.
11. The dielectric material and substrate are fired in a tunnel kiln (850 degrees Centigrade peak for 10 minutes).
12. Resistors 43 and 44 are cut or trimmed using a laser to balance the bridge resistance.
13. The overcoat 85 is deposited over resistors 43, 44 and circuit lines 50.
14. The substrate 30 is placed in a curing oven to cure overcoat 85 for 2 hours at 150 degrees Centigrade.
15. Solder paste is screen printed onto mounting pads 52.
16. Integrated circuit 80 is placed onto the solder paste on mounting pads 52.
17. The substrate 30 is placed into a solder reflow oven to melt the solder paste and attached integrated circuit 80.

18. Substrate 30 is glued onto support substrate 24 using adhesive 36.

19. Sensor 20 is electrically tested.

Alternative Embodiment

Figure 6:
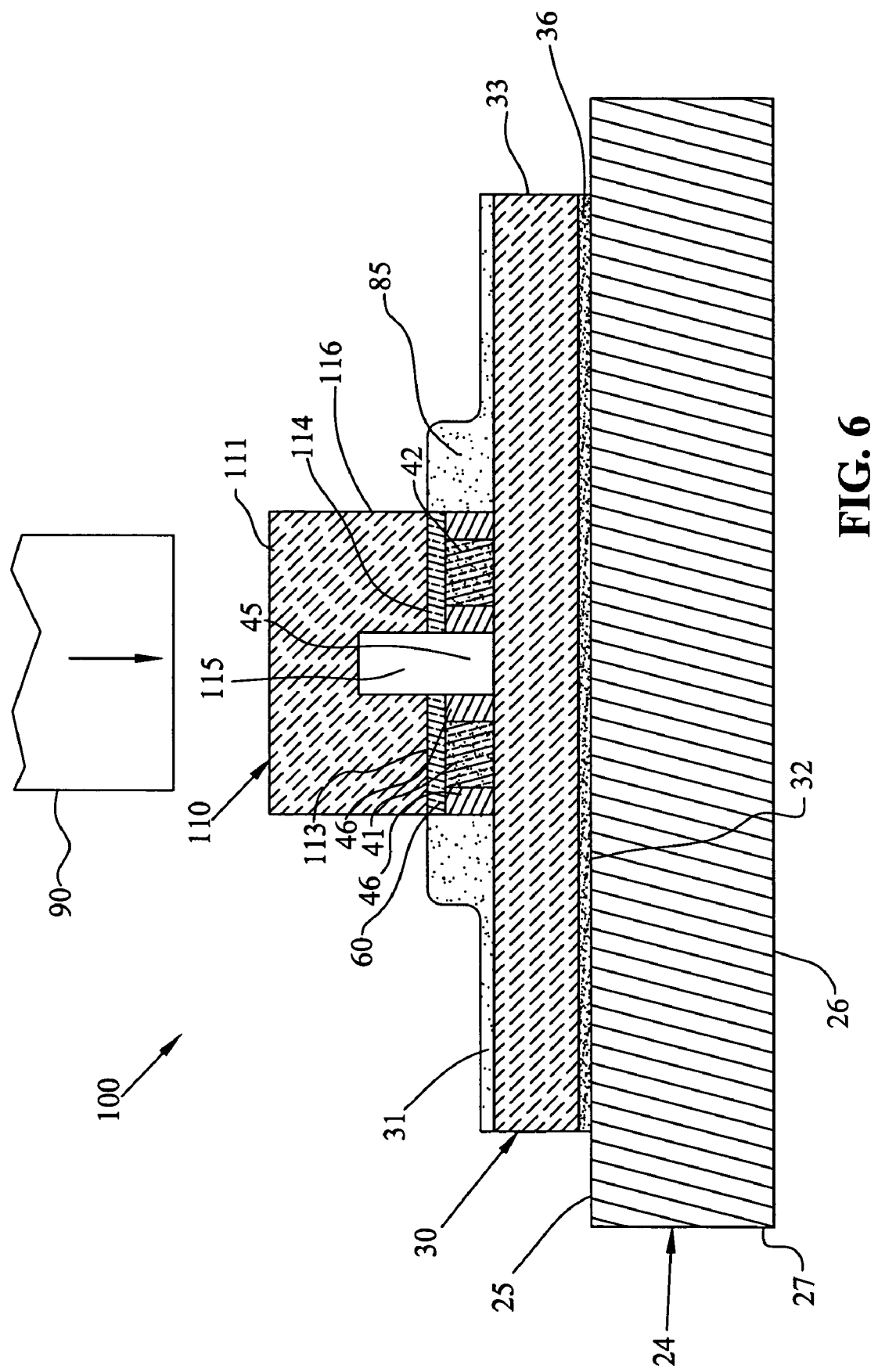
FIG. 6 is a side cross-sectional view of an alternative embodiment of a compression strain sensor in accordance with the present invention.

Referring to FIG. 6, another embodiment of a strain gage or load cell 100 is shown. Load cell 100 is similar to load cell 20 except that actuator 70 has been replaced by actuator 110.

Ceramic actuator or load transfer device 110 is also mounted to dielectric layer 60. Actuator 110 has a top 111, bottom portions 112 and 113, slot 115 and sides 116. Ceramic actuator 110 can be placed onto dielectric layer 60 after the dielectric layer has been screened, but before firing. During firing, the ceramic actuator and dielectric layer sinter together and are attached to each other.

Ceramic actuator 110 is also adapted to be contacted by an external force or load 90. Load 90 can be applied in wide variety of manners and sizes. Load 90 acts upon actuator 110 and directly compresses resistors 41 and 42 under dielectric layer 60 between the actuator 110, substrate 30 and support 24. Bottom portion 113 directly compresses resistor 41 and bottom portion 114 directly compresses resistor 42. The contact area or shape of bottom portion 113 is approximately the same size as the area covered by resistor 41. The contact area or shape of bottom portion 114 is approximately the same size as the area covered by resistor 42. Actuator 110 concentrates more of the applied load directly onto the resistors 41 and 42 than does actuator 70.

Load cell 100 operates the same as load cell 20.

Discussion

One of ordinary skill in the art of designing and using load cells and strain gages will realize many advantages from using the present invention. The elimination of the bending beam and glued on strain gages of prior art sensors eliminates one of the major sources of sensor error and failure.

An additional advantage of the present invention is improved accuracy. Since the applied load directly compresses the strain sensitive resistors, the load cell can react directly to the magnitude of the applied load.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensor for sensing an applied load comprising:
   a) a rigid substrate having a first surface and a second surface;
   b) a first strain sensitive resistor mounted to the first surface, the first resistor having a first end and a second end, the first resistor having a first length and a first width defining a first area, a second strain sensitive resistor mounted to the first surface, the second resistor having a third end and a fourth end, the second resistor having a second length and a second width defining a second area, a third strain sensitive resistor mounted to the first surface, the third resistor having a fifth end and a sixth end, the third resistor having a third length and a third width defining a third area, a fourth strain sensitive resistor mounted to the first surface, the fourth resistor having a seventh end and an eighth end, the fourth resistor having a fourth length and a fourth width defining a fourth area;
   c) a plurality of conductors mounted to the first surface and connected between the resistors;
   d) a dielectric layer mounted over the first and second resistors; and
   e) a load transfer device mounted to the dielectric layer, the load transfer device transferring the applied load directly to the first and second strain sensitive resistors such that the first and second resistors are compressed, the first and second resistors changing resistance in response to the applied load.

2. The sensor according to claim 1, wherein the third and fourth resistors are not located under the toad transfer device.

3. The sensor according to claim 1, wherein the first, second, third and fourth resistors are connected in a wheatstone bridge.

4. The sensor according to claim 1, wherein a support is mounted adjacent the second surface.

5. The sensor according to claim 1, wherein the substrate is ceramic.

6. The sensor according to claim 1, wherein the load transfer device is formed from ceramic and is bonded to the first resistor by the dielectric layer.

7. A sensor comprising:
   a) a substrate having a first and second surface;
   b) a pair of first resistors mounted to the first surface, each of the first resistors having a length, a width and a height, the length, width and height defining a resistor volume, the first resistors each having a resistance that varies with an applied load;
   c) a plurality of circuit lines formed on the first surface and attached to opposing sides of the first resistors, the circuit lines providing an electrical connection between the first resistors and an external electrical circuit;
   d) a dielectric layer overlying the first resistors;
   e) a load transfer device overlying the dielectric layer; and
   f) the first resistors adapted to be directly pressed on by the load transfer device, the first resistors adapted to be uniformly compressed by the applied load such that the resistor volume changes with a change in the applied load, the change in resistor volume generating a change in the resistance of the first resistors.

8. The sensor according to claim 7, wherein the load transfer device has a first portion and a second portion separated by a slot.

9. The sensor according to claim 7, further comprising a pair of second resistors mounted to the first surface of the substrate on opposing sides of the load transfer device.

10. The sensor according to claim 9, wherein the resistors are connected to form a wheatstone bridge.

11. The sensor according to claim 7, wherein a voltage is applied to the resistors, the voltage changing across the resistors as the resistance changes.

12. A sensor for sensing an applied load comprising:
   a) a substrate;
   b) first, second, third and fourth strain sensitive resistors mounted to the substrate for sensing strain in response to the applied load, the resistors being connected to form a wheatstone bridge and configured to generate an electrical signal that is proportional to the magnitude of the applied load;
   c) a dielectric layer mounted over the first and second resistors; and
   d) a load transfer device mounted to the dielectric layer for transferring the applied load to the first and second resistors, wherein the third and fourth resistors are not subjected to the applied load.

13. The sensor according to claim 12, wherein the third and fourth resistors are not located under the load transfer device.

14. The sensor according to claim 12, wherein the third and fourth resistors are located on opposite sides of the load transfer device.

15. The sensor according to claim 12, wherein the load transfer device has a first portion and a second portion separated by a slot.

16. The sensor according to claim 15, wherein the first portion is aligned with the first resistor and the second portion is aligned with the second resistor.

17. The sensor according to claim 12, wherein the third and fourth resistors are located on opposite sides of the load transfer device.

* * * * *